United States Patent Office 3,277,211
Patented Oct. 4, 1966

3,277,211
PENTAHALOCYCLOPENTADIENYL-SUBSTITUTED PHOSPHATES
Sheldon B. Greenbaum, Tonawanda, and Edward D. Weil, Lewiston, N.Y., assignors to Hooker Chemical Corporation, Niagara Falls, N.Y., a corporation of New York
No Drawing. Filed Mar. 20, 1964, Ser. No. 353,616
16 Claims. (Cl. 260—928)

This is a continuation-in-part of application Serial No. 216,035, filed August 10, 1962, now abandoned.

This invention relates to novel compositions of matter and to processes for producing them. More specifically, the present invention is concerned with halogenated phosphorohalidates, derivatives thereof and to processes for preparing them.

The novel compounds of the instant invention are useful as chemical intermediates, pesticides and as flame-retardant additives for synthetic organic resins.

The novel compounds of this invention can be represented by the following general formula:

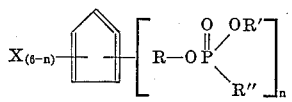

wherein:
X is a halogen atom, such as chlorine or bromine;
R is an alkylene radical containing from 2 to about 6 carbon atoms, of which the free valences are on separate carbon atoms, said separate carbon atoms preferably being separated by not more than 2 carbon atoms, said alkylene radical being an organic radical which may be considered to be a divalent or polyvalent aliphatic radical.
R' is a radical selected from the group consisting of alkyl, aryl and substituted aryl;
R'' is selected from the group consisting of halogen, hydroxy, amino, substituted amino, alkoxy, alkoxyalkoxy, alkylmercaptoalkoxy, aryloxy, and substituted aryloxy; and
n is a number from 1 to 5, inclusive.

Among the R' substituents are alkyl of from 1 to about 20 carbon atoms, and preferably of 1 to about 8 carbon atoms, such as methyl, ethyl, propyl, isopropyl, butyl, isobutyl, pentyl, hexyl, heptyl, octyl, nonyl, dodecyl, hexadecyl, stearyl, eicosyl and the like, said alkyl radical being a monovalent radical which may be considered as derived from an aliphatic hydrocarbon by the removal of one hydrogen atom; aryl of from 6 to about 14 carbon atoms and preferably of 6 to about 10 carbon atoms such as phenyl, naphthyl, anthracyl, salicyl and the like, said aryl group being an organic radical which may be considered as derived from an aromatic hydrocarbon by the removal of one hydrogen atom; substituted aryl by alkyl of from 1 to 20 carbon atoms and preferably of from 1 to 8 carbon atoms, such as methylphenyl, ethylphenyl, propylphenyl, butylphenyl, tridecylphenyl, eicosylphenyl, trimethylphenyl, methylnaphthyl, ethylanthracyl, octylphenyl, dodecylphenyl, and the like, as well as their various isomers, nitro-substituted and halogen-substituted radicals, e.g., chlorine- and bromine-substituted aryls. The R' substituent may also be attached to the R substituent by a chemical bond, when R is polyvalent.

Illustrative examples of the R'' substituent include halogen, such as chlorine or bromine; hydroxy; amino; alkyl-substituted amino, e.g., —NH—alkyl, —N(alkyl)₂; alkoxy of from 1 to about 20 carbon atoms and preferably of 1 to about 8 carbon atoms, such as methoxy, ethoxy, propoxy, butoxy, pentoxy, hexyloxy, octyloxy, decyloxy, dodecyloxy, octadecyloxy, and the like, said alkoxy substituents being an alkyl radical which is attached to the remainder of the molecule by oxygen, alkylmercaptoalkoxy such as ethyl-mercaptoethoxy, propylmercaptobutoxy, and the like, aryloxy of from 6 to about 14 carbon atoms and preferably of 6 to about 10 carbon atoms such as phenoxy and aryloxy substituted by halogen, nitro, alkyl, and substituted alkyl; and alkoxyalkoxy of 1 to about 20 carbon atoms and preferably of 1 to about 8 carbon atoms, such as 2-(methoxy) ethoxy, 2-(ethoxy) ethoxy, butoxyethoxy, ethoxy, propyloxy, and the like.

Examples of novel products and reactions of the present invention wherein R' is halogen include the following:

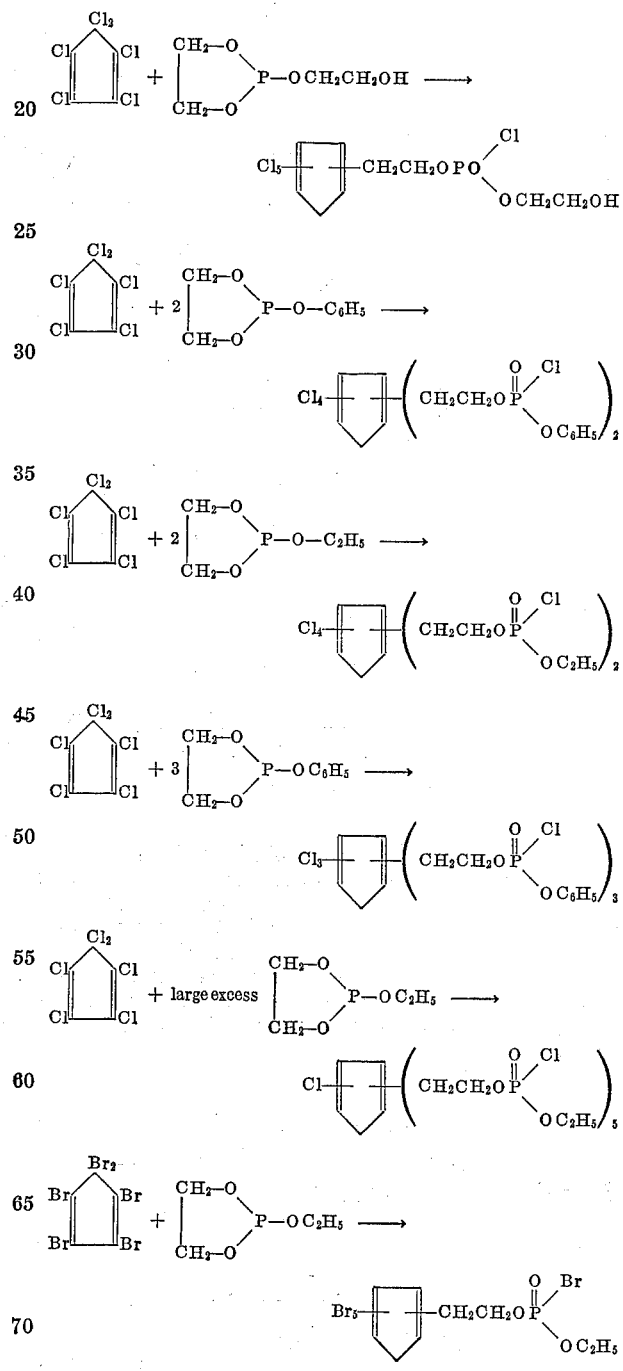

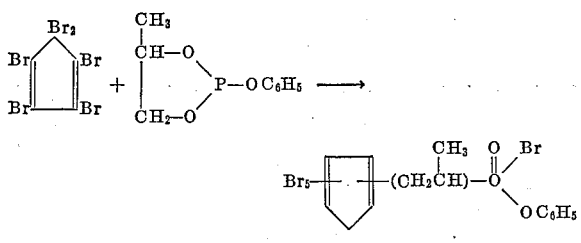

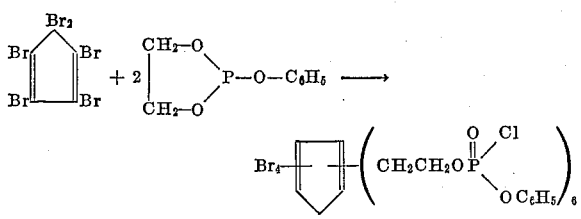

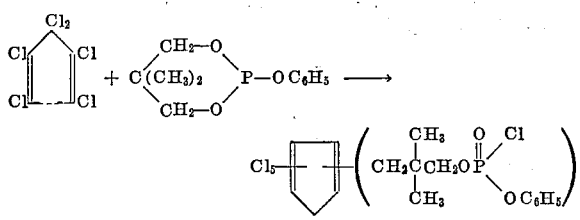

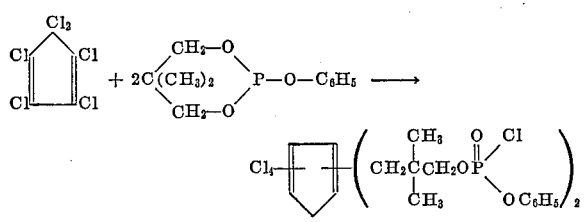

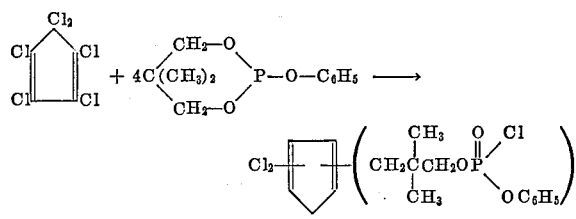

The radical R may be further substituted by a second like polyhalocyclopentadienyl group and/or by a second like phosphate group. Such a situation arises where, for example, R is a pentaerythrityl radical, a trimethylolalkane radical, or the like, as illustrated in the following two equations. The term "alkylene radical" used in respect to R is intended herein to encompass such radicals as exemplified by pentaerythrityl and trimethylolalkane radicals.

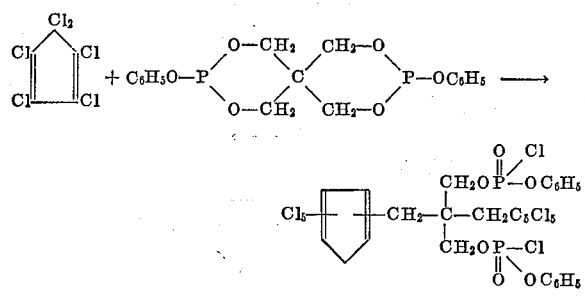

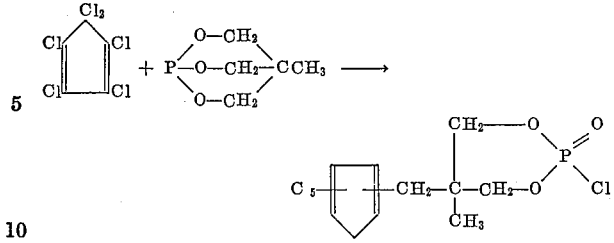

The novel compounds of the present invention wherein R″ is halogen are prepared by the reaction of hexahalocyclopentadiene with a cyclic phosphite of the formula:

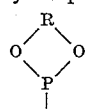

where R and R′ are as described herein. The radical R′ may in some instances be conjoined with the alkylene group R. The alkylene substituent R and R′ groups may be further substituted by alkyl, aryl, halogen, nitro, hydroxy, alkoxy, and aryloxy substituents. The alkylene group R may also bear a second phosphite ring, as in the case of the pentaerythrityl bis-cyclic phosphite. These cyclic phosphites are prepared by known methods such as exemplified by the method of U.S. Patent No. 2,841,608.

Generally, the reaction is effected by admixing the reactants in the liquid phase at temperatures from at least $-20$ degrees centigrade to about 180 degrees centigrade. A preferred temperature range is from about 0 degrees centigrade to 150 degrees centigrade. Although no solvent has to be employed, an inert solvent, such as a hydrocarbon or an ether, can be used, if desired, to facilitate the reaction.

The reaction can be conveniently followed by titration of unreacted phosphite, using iodine or other suitable oxidant as titrating reagent. When titration indicates consumption of phosphite, the reaction is complete. The product can be used without further purification, when equimolar amounts of the reactants have been employed. Where an excess of one or the other reactant has been used, the excess may be removed by vacuum distillation or other suitable means.

Atmospheric pressure is conveniently used when conducting the process of the instant invention. However, sub- or super-atmospheric pressures may be utilized without departing from the scope of the invention.

The molar ratio of reactants is generally from about 1 mole of hexahalocyclopentadiene to about 1 to 5 moles of the phosphite, the number of phosphate groups being introduced in the cyclopentadiene ring depending on the molar ratio of reactants employed. Thus, when only one phosphite is to be introduced about 1 mole of phosphite reactant is used, while if 5 moles of phosphite are to be introduced into the cyclopentadiene ring about 5 moles of phosphite reactant are used. Excess may be employed to force the reaction. It is advantageous to add the phosphite reactant to the hexahalocyclopentadiene and it is also advantageous to employ an excess of hexahalocyclopentadiene to obtain yields of 1:1 reaction product. The use of a greater than 1:1 ratio of phosphite to cyclopentadiene is conducive to polysubstitution onto the ring. Where polysubstitution is caused to occur, the products are generally mixtures and may be used as such for many applications, or may be separated by fractional distillation or other methods known in this art.

Exhaustive hydrolysis of the phosphate group results in the formation of the corresponding alcohols of the formula:

wherein R and *n* are as defined herein. Examples of these alcohols are 2-(pentachlorocyclopentadienyl) ethanol, 2- and 3-(pentachlorocyclopentadienyl) propanol and 2-, 3-, and 4-(pentachlorocyclopentadienyl) butanol. These alcohols are useful as pesticidal agents, especially as herbicides and as chemical intermediates.

Further reaction of the products of the present invention wherein R″ is halogen with a nucleophilic reagent such as ammonia, an amide, an alcohol or a phenol yields polyhalocyclopentadienylalkyl phosphoramidates, O-alkyl phosphates or O-aryl phosphates, respectively, having insecticidal properties.

Hydrolysis of the compounds of the invention, where R″ is halogen by treatment with water (preferably one molar equivalent added in a cosolvent such as acetone, dioxane, formic acid, or the like), yields the corresponding acid, wherein R″ is hydroxyl. These acids and their salts, e.g., sodium, potassium, ammonium, methylammonium, or other lower alkyl ammonium salts exhibit herbicidal activity.

The reaction of the phosphorohalidates of the invention with ammonia or amines is conducted by admixing the products of the present invention (wherein R″ is halogen) with the ammonia or amine at a temperature between about −10 degrees centigrade to 150 degrees centigrade. A catalyst is not required and although atmospheric pressure is conveniently employed, sub- or super-atmospheric pressures can be utilized.

Suitable amines include those amines containing from 1 to about 18 carbon atoms and preferably of 1 to about 6 carbon atoms such as methylamine, ethylamine, propylamine, alkylamine, isopropylamine, butylamine, amylamine, hexylamine, cyclohexylamine, dimethylamine, diethylamine, dipropylamine, dialkylamine, diisopropylamine, dibutylamine, diamylamine, dihexylamine, piperidine and morpholine.

The reaction of the phosphorohalidates with alcohol or phenols is conducted by mixing phenol or the alcohol with said phosphorohalidates and usually about a molar equivalent of base strong enough to form the alcoholate or phenolate, in the temperature range of about −10 degrees centigrade to about 150 degrees centigrade. Examples of such bases include the alkali metal hydroxides, such as sodium hydroxide, potassium hydroxide, and the like. Suitable alcohols include lower aliphatic alcohols such as methanol, ethanol, propanol, allyl alcohol, isopropanol, butanol, amyl alcohol, hexyl alcohol, cyclohexanol, glycol, methoxyethanol, ethoxyethanol, ethylmercaptoethanol, chloroethanol, propylene chlorohydrin and aminoethanol. Also suitable are phenols, chlorinated phenols such as p-chlorophenol, 2,4-dichlorophenol, 2,4,5-trichlorophenol, cresols, chlorocresols, isopropylphenols, butylphenols, 2-chloro-4-tert-butylphenol, and nitrophenols such as p-nitrophenol, 4-nitro-3-chlorophenol, 4-nitro-m-cresol, and 2,4-dichloro-6-nitrophenol, for example. Preferred reactants are methyl, ethyl, 2-chloroethyl, p-nitrophenol, 2,4-dichlorophenol and 2,4,5-trichlorophenol, because of exceptional pesticidal activity obtained with the esters prepared from these alcohols. No catalyst is required for this process and it, too, is usually conducted at atmospheric pressure, although sub- or super-atmospheric pressures can also be utilized.

The compounds of the invention wherein R″ is halogen have, as above indicated, utility as chemical intermediates. They have also utility per se as flame retardants for resins and elastomers. Furthermore, the polyhalocyclopentadienyl moiety has the ability to tie the molecule into unsaturated resins and elastomers by a thermal reaction, probably of the Diels-Alder type. Thus, the flame-retardant compounds of the invention can be permanently bound into an unsaturated resin, such as a polymaleate or an unsaturated elastomer such as polybutadiene. Furthermore, the polyhalocyclopentadienyl group can be reacted thermally with unsaturated anhydrides such as maleic anhydride to obtain polyfunctional monomers for use in polyester and epoxy resins, for preparing and/or curing said resins.

The reaction products of the invention wherein R″ is alkoxy, phenoxy, halogenated and/or nitrated phenoxy (with or without alkyl groups on the phenyl ring), amino, alkylamino, or dialkylamino are in general pesticidal compounds, possessing activity on insects, mites, nematodes, and other lower animal pests.

The initial reaction leading to the compounds of the invention (where R″ is halogen) is surprising and unexpected in view of the prior art. It has been known from the work of Michaelis, Arbuzov, and others that the usual reaction of a chlorinated hydrocarbon compound with a phosphate is:

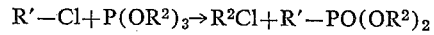

$$R'-Cl + P(OR^2)_3 \rightarrow R^2Cl + R'-PO(OR^2)_2$$

i.e., that the phosphorus containing product is a phosphonate. That the reaction of the present invention does not take this usual course is shown by the fact that a —PO—Cl structure is formed (detectible by its reaction with compounds which characteristically react only with acid chlorides under the conditions employed) and by the hydrolysis of the phosphate ester linkage to yield alcohols of the structure $C_5X_5ROH$.

The following specific examples further illustrate the invention. However, this detailed disclosure is not to be construed as limiting the scope of the instant invention.

In the specification, examples, and claims, part are by weight and temperatures are in degrees centigrade, unless otherwise indicated.

*Example 1.—Reaction of ethyl ethylene phosphite and hexachlorocyclopentadiene yielding a 1:1 reaction product*

27.3 grams of hexachlorocyclopentadiene were dissolved in 50 milliliters of benzene and 13.6 grams of ethyl ethylene phosphite were added thereto dropwise. The reaction mixture was spontaneously heated up to 56 degrees centigrade. When the exotherm subsided after completion of the addition, the phosphite titration (by iodimetry) was zero. The mixture was then allowed to stir overnight. The solvent was carefully removed and the hexachlorocyclopentadiene remaining was carefully distilled off from the reaction mixture. The mixture was then distilled in a Hickman still, yielding a liquid product distilling at 90 to 100 degrees centigrade at 17 to 20 microns of mercury pressure. The analysis corresponds to that of the product of the reaction of one mole of phosphate and one mole of hexachlorocyclopentadiene or $C_9H_9O_3Cl_6P$.

*Analysis.*—Calculated for $C_9H_9O_3Cl_6P$—percent Cl—theoretical—52.1. Found—52.4.

*Example 2.—Preparation of phenyl pentachlorocyclopentadienylethyl phosphorochloridate*

185 grams of phenyl ethylene phosphite were gradually added to a refluxing solution of 273 grams of hexachlorocyclopentadiene in two volumes of benzene. Completion of the reaction was observed by loss of reducing power of an aliquot, when titrated with standard iodine solution in benzene. Removal of the solvent under vacuum provided the desired product, a viscous syrup having substantially the correct phosphorus and chlorine analysis.

A 25-gram portion of the product of Example 2 was refluxed for a week with 3-N hydrochloric acid in aqueous ethanol. The solution was freed of solvent under pressure, and the residue was taken up in benzene. The phenol was removed by a rapid washing with cold dilute sodium hydroxide solution. The benzene layer was further washed with water and dried over magnesium sulfate. Removal of the benzene under reduced pressure and fractional distillation yielded a product characterized by correct chlorine analysis, absence of phosphorus and presence of infrared hydroxyl bands, as in pentachlorocyclopentadienylethyl alcohol. This was a viscous yellowish liquid, distillable in a short-path still; B.P. 100–110 degrees centigrade (0.005 mm. mercury).

*Example 3.—Preparation of 2,4,5-trichlorophenyl pentachlorocyclopentadienylethyl phosphorochloridate*

To a refluxing solution of 273 grams of hexachlorocyclopentadiene were gradually added 287 grams of 2,4,5-trichlorophenyl ethylene phosphite (prepared analogously to procedure of U.S. Patent 2,841,608). When an aliquot titrated with standard iodine solution showed no remaining phosphite, the reaction mixture was stripped under vacuum at 80 to 100 degrees centigrade to remove solvent, leaving a reddish syrup, having the correct phosphorus and chlorine analysis.

*Example 4.—Preparation of diethyl pentachlorocyclopentadienylethyl phosphate*

A solution of 409 grams of the product of Example 1 dissolved in 1,000 cc. of dimethylether of ethylene glycol, was treated at reflux with a solution of 68 grams of sodium ethoxide in 1,000 cc. of the same solvent. After two days at reflux, the solution was evaporated to remove the solvent, the residue was taken up in benzene, the sodium chloride was filtered off (one mole isolated), and the benzene filtrate was evaporated under vacuum to leave the desired product as an oily residue having the correct chlorine and phosphorus analysis.

In a similar manner to Example 4, the corresponding bromine compound is prepared by employing a similar amount of hexabromocyclopentadiene in the place of hexachlorocyclopentadiene resulting in the product of the formula $C_{11}H_{19}O_9Br_5P$.

*Example 5.—Preparation of ethyl pentachlorocyclopentadienylethyl phosphoramidate*

A solution of 409 grams of the product of Example 2 in 1,000 cc. of dioxane is cooled to 10 degrees and ammonia passed in until about 40 grams had dissolved. The solution was then sealed in an autoclave and maintained at 100 degrees for one day. The solution is then cooled and filtered to remove ammonium chloride and evaporated to remove the dioxane, leaving a reddish-brown syrup which partially set to a wax on standing. The amino group was shown to be part of an amide structure by the insolubility of the product in aqueous hydrochloric acid.

*Example 6.—Preparation of 2,4-dichlorophenyl pentachlorocyclopentadienylethyl phosphorochloridate*

In the manner of Example 3, 2,4-dichlorophenyl ethylene phosphite was reacted with hexachlorocyclopentadiene to obtain a viscous syrup having the correct analysis for the desired product and capable of reaction with amines to form amides as per the following example.

*Example 7.—Preparation of 2,4-dichlorophenyl pentachlorocyclopentadienylethyl isopropylphosphoroamidate*

A solution of 526 grams of the product of Example 6 in 1,000 cc. of benzene was heated with 119 grams of isopropylamine for 24 hours at reflux. The solution was then washed with cold water to remove isopropylamine hydrochloride, and then was evaporated to dryness to obtain a viscous amber syrup, insoluble in aqueous hydrochloric acid and having substantially the correct analysis for the indicated product.

*Example 8.—Preparation of ethyl pentachlorocyclopentadienylethyl N,N-diethylphosphoramidate*

In the manner of the preceding example, the product of Example 1 was reacted with 2 molar equivalents of diethylamine to obtain an amber viscous syrup, insoluble in cold dilute or cold concentrated hydrochloric acid and therefore shown to be an amide rather than an amine. The product has the correct nitrogen analysis for the desired amide.

*Example 9.—Preparation of ethyl p-nitrophenyl pentachlorocyclopentadienylethyl phosphate*

A solution of 409 grams of the product of Example 1 in 1,000 cc. of dioxane was heated at 100 degrees centigrade for two days with 161 grams of sodium p-nitrophenoxide and one gram of cuprous chloride as catalyst. The solution was then cooled and filtered, to remove approximately one mole of sodium chloride.

The residue obtained on evaporation of the solvent was a reddish brown syrup, shown by infrared to contain the nitrophenoxy radical.

In a similar manner to Example 9, the corresponding bromine compound is prepared by using a similar hexabromocyclopentadiene in the place of hexachlorocyclopentadiene resulting in a product of the formula $$C_{15}H_{13}O_6Br_5NP$$

*Example 10.—Preparation of phenyl 3-(pentachlorocyclopentadienyl)-2,2-dimethylpropyl phosphorochloridate*

One mole of phenyl neopentylene phosphite (U.S. Pat. 2,834,798) was refluxed in benzene with one mole of hexachlorocyclopentadiene, until titration of an aliquot showed no phosphite remaining. Upon evaporation of the solvent, the product obtained was a viscous syrup, having one reactive acid chloride chlorine atom per mole (as shown by reaction with two moles of diethylamine to obtain an N,N-diethyl amide.

*Example 11*

The products of Examples 4, 5, 6 and 10 were dissolved in xylene (100 parts of xylene to 1 part by weight of compound), plus Triton X–100 (non-ionic emulsifier) and dispersed in water to form emulsions containing 0.5 percent active ingredient. These emulsions were sprayed on plants infested with pea aphids and with mites (*Tetranychus atlanticus*). Substantially complete kill of both species was recorded 24 hours later. Control plants treated with the xylene-emulsifier combination alone showed no aphid or mite kill.

The phosphoramidates of the invention also have utility as herbicides. The product of Example 8, applied at 20 pounds per acre to turf infested with seeds of crabgrass (*Digitaria sanguinalis*) substantially prevented normal germination and emergence of crabgrass.

*Example 12.—Reaction of ethyl ethylene phosphite and hexachlorocyclopentadiene yielding a 2:1 reaction product*

27.3 grams of hexachlorocyclopentadiene were dissolved in 50 milliliters of benzene, followed by the dropwise addition of 13.6 grams of ethyl ethylene phosphite, dissolved in 25 milliliters of carbon tetrachloride. The mixture was heated and the temperature was kept below 10 degrees centigrade. After standing for several days, the mixture was carefully stripped of solvent and the hexachlorocyclopentadiene and trace of the lower boiling compounds present were removed in a Hickman-type molecular still. The oil analyzed as a product of 2 moles of phosphite and 1 mole of hexachlorocyclopentadiene.

*Analysis:* Calculated for $C_{13}H_{18}Cl_6O_6P_2$—percent P—theoretical—11.9; found—11.4. Percent Cl—theoretical—39.2. Found—35.9.

*Example 13.—Reaction of ethyl ethylene phosphite and hexachlorocyclopentadiene at a 5:1 ratio of reactants*

A solution of 13.7 grams (0.05 mole) of hexachlorocyclopentadiene and 50 milliliters of benzene were treated by dropwise addition, with 42.4 grams of ethyl ethylene phosphite dissolved in 140 milliliters of benzene. The reaction was followed by titration with 0.1 N iodine in benzene. After the reaction mixture had been stirred overnight, the titration indicated the consumption of 5 moles of phosphite per mole of hexachlorocyclopentadiene.

The reaction mixture was stripped to 100 degrees centigrade at 0.001 milliliters of mercury to remove unreacted phosphite, leaving a viscous syrup having a correct phosphorus analysis for the desired substituted cyclopentadiene, considered as being of the formula:

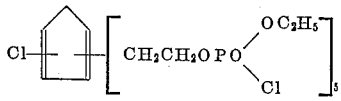

The utility of the products of the invention as herbicides is illustrated by the following example.

*Example 14*

An aqueous emulsion of the product of Example 1 is sprayed at the rate of 20 pounds per acre onto a mixed weed population consisting largely of pigweed and ragweed. After two days, substantially complete weed kill is observed.

Employing the product of Examples 4 and 5 at the same rate, about 80 and 90 percent weed kill, respectively, is observed under similar conditions.

In similar reactions, the following compounds are made:

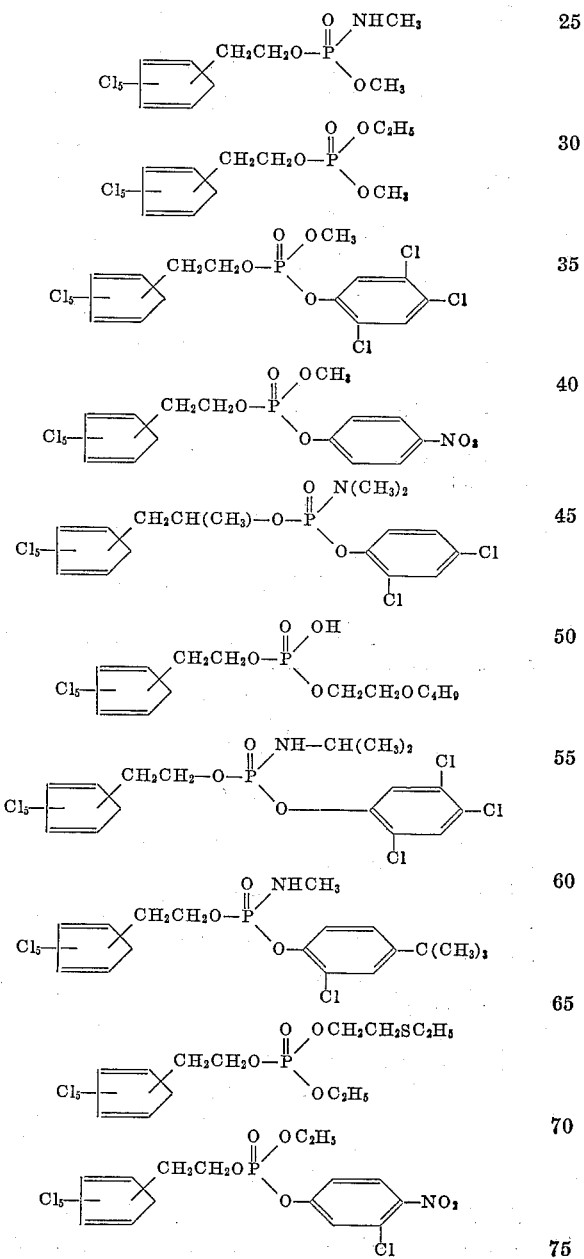

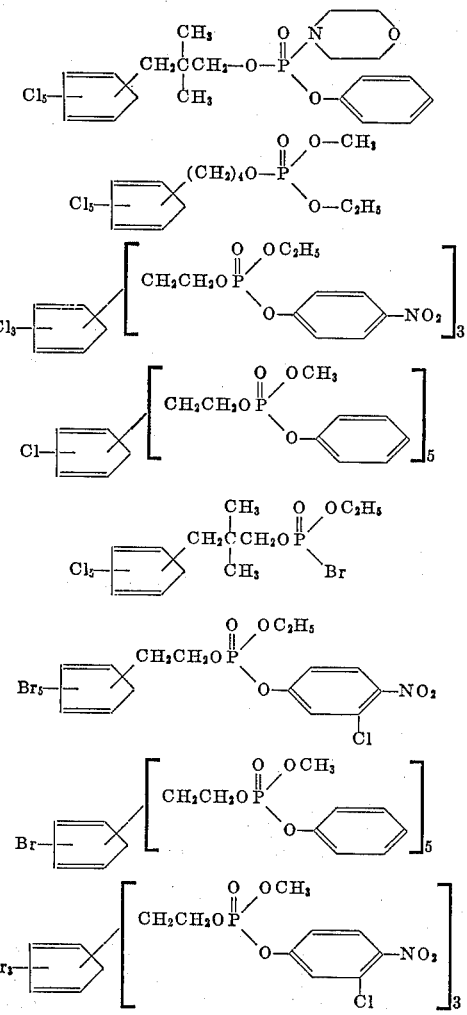

Various changes and modifications may be made in the method and products of this invention, certain preferred forms of which have been herein described, without departing from the spirit and scope of the invention, and are within the scope of the invention.

What is claimed is:
1. A compound of the formula

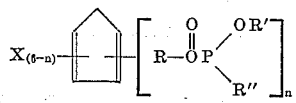

wherein:
X is selected from the group consisting of chlorine and bromine;
n is from 1 to 5;
R is selected from the group consisting of:
  (1) unsubstituted alkylene
  (2) alkylene substituted with a substituent selected from the group consisting of:
    (a) alkyl
    (b) aryl
    (c) halogen
    (d) nitro
    (e) hydroxy
    (f) polyhalocyclopentadienyl
    (g) alkoxy
    (h) aryloxy (i) 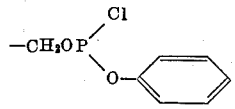

the free valences of said alkylene being on two different carbon atoms, which, when separated, are separated by no more than 2 carbon atoms;

R' is selected from the group consisting of:
  (1) unsubstituted alkyl
  (2) alkyl substituted with a substituent selected from the group consisting of:
    (a) nitro
    (b) aryl
    (c) halogen
    (d) hydroxy
    (e) alkoxy
    (f) aryloxy
  (3) unsubstituted aryl
  (4) aryl substituted with a substituent selected from the group consisting of:
    (a) nitro
    (b) alkyl
    (c) bromine
    (d) chlorine
    (e) hydroxy
    (f) alkoxy
    (g) aryloxy R'' is selected from the group consisting of:
  (1) chlorine
  (2) bromine
  (3) hydroxy
  (4) amino
  (5) alkyl substituted amino
  (6) alkoxy
  (7) alkoxyalkoxy
  (8) alkylmercaptoalkoxy
  (9) aryloxy
  (10) alkyl-substituted aryloxy
  (11) chloro-substituted aryloxy
  (12) bromo-substituted aryloxy
  (13) nitro-substituted aryloxy said alkylene being from 2 to about 6 carbon atoms; said alkyl being from 1 to about 20 carbon atoms; said aryl being from 6 to about 14 carbon atoms; said alkoxy being from 1 to about 20 carbon atoms; and said aryloxy being from 6 to about 14 carbon atoms.

2.

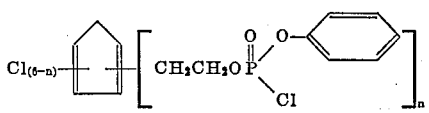

wherein $n$ is from 1 to 5, inclusive.

3.

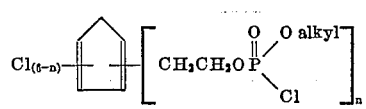

wherein $n$ is from 1 to 5, inclusive, and alkyl is of 1 to about 20 carbon atoms.

4.

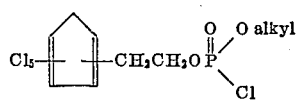

wherein said alkyl is from 1 to about 20 carbon atoms.

5.

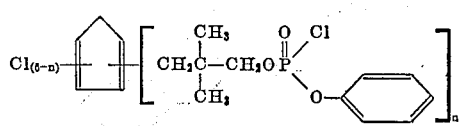

wherein $n$ is from 1 to 5, inclusive.

6.

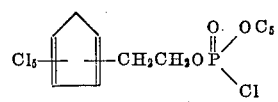

7.

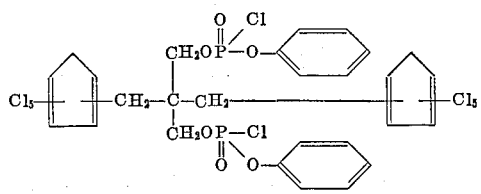

8.

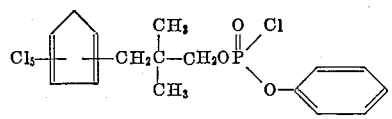

9.

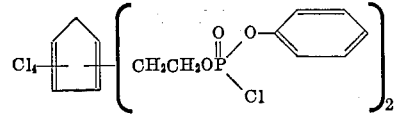

10.

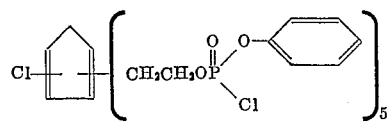

11. Ethyl 2,4,5-trichlorophenyl pentachlorocyclopentadienylethyl phosphate.

12. Diethyl pentachlorocyclopentadienylethyl phosphate.

13. A process for the preparation of a compound of the formula:

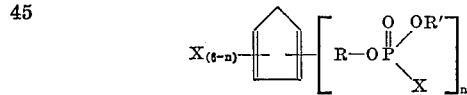

which comprises reacting hexahalocyclopentadiene with a cyclic phosphite of the formula:

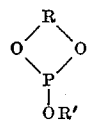

wherein the substituent R, R', $n$ and X are as defined in claim 1, at a temperature of from about −20 degrees centigrade to about 180 degrees centigrade.

14. A process in accordance with claim 13 wherein the hexahalocyclopentadiene used is hexachlorocyclopentadiene.

15. A process for the preparation of the compounds of claim 1 wherein R'' is selected from the group consisting of amino, alkylamino, and dialkylamino which comprises reacting a compound of the formula:

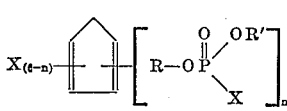

wherein R, R', X and $n$ are as defined in claim 1, with a compound selected from the group consisting of ammonia, dialkylamine and alkyl amine, at a temperature from about −10 degrees centigrade to 150 degrees centigrade.

16. A process for the preparation of the compounds of claim 1 wherein R″ is selected from the group consisting of alkoxy, phenoxy, chloro-substituted phenoxy, bromo-substituted phenoxy nitro-substituted phenoxy and alkyl-substituted phenoxy which comprises reacting:

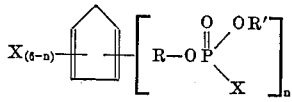

wherein R, R′, X and $n$ are as defined in claim 1 with a compound selected from the group consisting of an alcohol, phenol, and substituted phenol at a temperature between about −10 degrees centigrade to about 150 degrees centigrade in the presence of an alkali metal hydroxide.

References Cited by the Examiner
UNITED STATES PATENTS

| | | | |
|---|---|---|---|
| 2,769,743 | 11/1956 | Mattson | 167—30 |
| 2,954,318 | 9/1960 | Ludvik | 167—30 |
| 3,013,048 | 12/1961 | Holtschmidt | 260—461 |
| 3,013,049 | 12/1961 | Holtschmidt | 260—461 |

CHARLES B. PARKER, *Primary Examiner.*

J. B. BRUST, F. M. SIKORA, *Assistant Examiners.*